(12) United States Patent
Han (10) Patent No.: US 7,941,705 B2
(45) Date of Patent: May 10, 2011

(54) COMPUTER SYSTEM TO USE MEMORY HAVING DEFECTIVE MEMORY CELL AND CONTROL METHOD THEREOF

(75) Inventor: Kyu-in Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 11/758,245

(22) Filed: Jun. 5, 2007

(65) Prior Publication Data

US 2008/0104450 A1    May 1, 2008

(30) Foreign Application Priority Data

Oct. 25, 2006  (KR) .................. 10-2006-0103957

(51) Int. Cl.
*G06F 11/00* (2006.01)
(52) U.S. Cl. .......................... 714/42; 714/723
(58) Field of Classification Search .......... None
See application file for complete search history.

(56) References Cited

U.S. PATENT DOCUMENTS

| | | | | |
|---|---|---|---|---|
| 4,051,354 A * | 9/1977 | Choate | ........................... | 714/711 |
| 5,602,987 A * | 2/1997 | Harari et al. | ....................... | 714/8 |
| 5,677,881 A | 10/1997 | Seo et al. | | |
| 5,864,661 A | 1/1999 | Ohara | | |
| 5,958,068 A | 9/1999 | Arimilli et al. | | |
| 6,052,798 A * | 4/2000 | Jeddeloh | ........................... | 714/8 |
| 6,115,828 A * | 9/2000 | Tsutsumi et al. | .................. | 714/7 |
| 6,223,308 B1 * | 4/2001 | Estakhri et al. | .................. | 714/42 |
| 6,332,183 B1 * | 12/2001 | Weber et al. | ................... | 711/170 |
| 6,421,283 B1 * | 7/2002 | Walley et al. | .................. | 365/200 |
| 6,895,537 B2 * | 5/2005 | Kawagoe et al. | .............. | 714/710 |
| 7,124,336 B2 * | 10/2006 | Adler et al. | ................... | 714/723 |
| 7,454,670 B2 * | 11/2008 | Kim et al. | ....................... | 714/710 |
| 2003/0061532 A1 * | 3/2003 | Benedix et al. | ................... | 714/7 |
| 2005/0144418 A1 * | 6/2005 | Kita | .............................. | 711/203 |

FOREIGN PATENT DOCUMENTS

| | | |
|---|---|---|
| JP | 8-63406 | 3/1996 |
| KR | 1999-32660 | 5/1999 |
| KR | 2000-65408 | 11/2000 |
| KR | 2006-12696 | 2/2006 |

OTHER PUBLICATIONS

Microsoft Computer Dictionary, 4th. Ed. 1999, Microsoft Press, p. 352.*
Chinese Search Report issued Oct. 10, 2008 in CN 2007101634610.

* cited by examiner

*Primary Examiner* — Christopher S McCarthy
(74) *Attorney, Agent, or Firm* — Stanzione & Kim, LLP (57) ABSTRACT

A computer system having a plurality of devices including a data storage part which includes a plurality of cells to store data, and a controller to inspect whether there is a defective cell in the data storage part if a condition to execute a cell inspection function is met, and sets the defective cell to be assigned to one of the devices if a defective cell is found.

17 Claims, 5 Drawing Sheets

COMPUTER SYSTEM TO USE MEMORY HAVING DEFECTIVE MEMORY CELL AND CONTROL METHOD THEREOF

CROSS-REFERENCE TO RELATED APPLICATIONS

This application claims priority under U.S.C. §119(a) from Korean Patent Application No. 2006-0103957, filed on Oct. 25, 2006 in the Korean Intellectual Property Office, the disclosure of which is incorporated herein in its entirety by reference.

BACKGROUND OF THE INVENTION

1. Field of the Invention

Apparatuses and methods of the present general inventive concept relate to a computer system and a control method thereof, and more particularly, to a computer system which inspects a defective cell in a memory, and a control method thereof.

2. Description of the Related Art

A conventional memory is used as a storage device in a computer system and has two types including a Random Access Memory (RAM) and a Read-Only Memory (ROM). RAM is generally used by a processor to read and write data, and is a typical volatile memory that loses stored data when the computer system powers off. ROM is used to store unchangeable data such as Basic Input/Output System (BIOS) and is a typical non-volatile memory that does not lose stored data when the computer system powers off.

Recently, there has been a trend to increase memory capacity. However, if only one of a plurality of cells in the memory becomes defective, the memory can become unavailable, thereby causing a whole system to be unavailable.

To prevent the foregoing problem, a conventional technology is disclosed in "System Memory Control Device," Korean Patent First Publication No. 1999-032660, wherein a memory including a defective cell can be available by using a circuit to rearrange addresses in the memory.

More specifically, the conventional technology inspects a memory and stores an address of a memory which replaces an address of a defective cell of a memory or defective memory address. A central processing unit (CPU) checks whether an address of a memory to be accessed is a defective memory address. If the memory address is in fact defective, a memory address is rearranged so that the memory cell indicating the defective memory address indicates a memory cell which indicates a replacement memory address. Accordingly, a memory which includes the defective cell may be used.

However, in the conventional technology, the CPU checks whether a memory address to be accessed is a defective memory address whenever the CPU accesses a memory. Further, since a memory address is replaced with a replacement memory address, it takes lots of time to access the memory. Thus, a system may deteriorate in performance, and a memory with high capacity does not operate efficiently.

Also, an additional circuit is provided to rearrange a memory address, and since the circuit does not operate if there is no defective cell, excessive power consumption may occur.

SUMMARY OF THE INVENTION

The present general inventive concept provides a computer system which allows use of a memory having a defective cell by blocking access by setting a predetermined device to use a region with a defective cell by way of software, and a control method thereof.

The present general inventive concept also provides a computer system which uses a memory with a defective cell without an additional circuit to thereby reduce cost and improve use period, and a control method thereof.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept are achieved by providing a computer system having a plurality of devices, comprising a data storage part which comprises a plurality of cells to store data, and a controller to inspect whether there is a defective cell in the data storage part if a condition to execute a cell inspection function is met, and sets the defective cell to be assigned to one of the devices if a defective cell is found.

The controller may perform the cell inspection function when a power on self test (POST) process is performed.

The computer system may further comprise a user selection part to select whether to perform the cell inspection function, wherein the controller performs the cell inspection function if the cell inspection function is selected from the user selection part.

The computer system may further comprise an address storage part to store an address of a defective cell of the data storage part, wherein the controller stores the address of the defective cell corresponding to the defective cell in the address storage part if there is the defective cell in the data storage part.

The controller may update the address of the defective cell stored in the address storage part according to whether the address of the defective cell of the data storage part is identical to the address of the defective cell previously stored in the address storage part as a result of the performance of the cell inspection function.

The controller may update by changing and/or deleting the address of the defective cell.

The foregoing and/or other aspects and utilities of the present general inventive concept may also be achieved by providing a control method of a computer system which comprises a plurality of devices and a data storage part to store data, comprising inspecting whether there is a defective cell in the data storage part if a condition to execute the cell inspection function is met, and setting the defective cell to be assigned to one of the devices if there is a defective cell in the data storage part.

The cell inspection function may be performed if a POST process is performed.

The cell inspection function may be performed if the cell inspection function is selected by a user.

The control method of the computer system may further comprise storing an address of a defective cell corresponding to the defective cell if there is the defective cell in the data storage part.

The control method of the computer system may further comprise updating the address of the defective cell stored in the address storage part according to whether the address of the defective cell of the data storage part is identical to the address of the defective cell previously stored in the address storage part as a result of performing the cell inspection function.

The updating may comprise changing and/or deleting the address of the defective cell.

The foregoing and/or other aspects and utilities of the present general inventive concept may also be achieved by providing a computer system, including a data storage part including a plurality of cells to store data, and a controller to inspect and determine whether there is a defective cell in the data storage part and to make the defective cell inaccessible so that the data storage part can be used.

The controller may perform the cell inspection function when the computer system is powered on.

The controller may make the defective cell inaccessible by assigning the defective cell to a predetermined device.

The computer system may further include an address storage part to store an address of a defective cell of the data storage part to prevent another device from accessing the defective cell.

The foregoing and/or other aspects and utilities of the present general inventive concept may also be achieved by providing a control method of a computer system with a data storage part including a plurality of data-storing cells, the method including inspecting to determine whether there is a defective cell in the data storage part, and controlling the defective cell to be inaccessible so that the data storage part can be used.

The method may further include assigning the defective cell to a predetermined device.

The method may further include updating an address of the defective cell if the defective cell is located again during a second inspection.

The foregoing and/or other aspects and utilities of the present general inventive concept may also be achieved by providing a computer readable recording medium having embodied thereon a computer program to execute a method, wherein the method includes inspecting whether there is a defective cell in the data storage part, and controlling the defective cell to be inaccessible.

The computer readable recording medium may further include assigning the defective cell to a predetermined device.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 1:
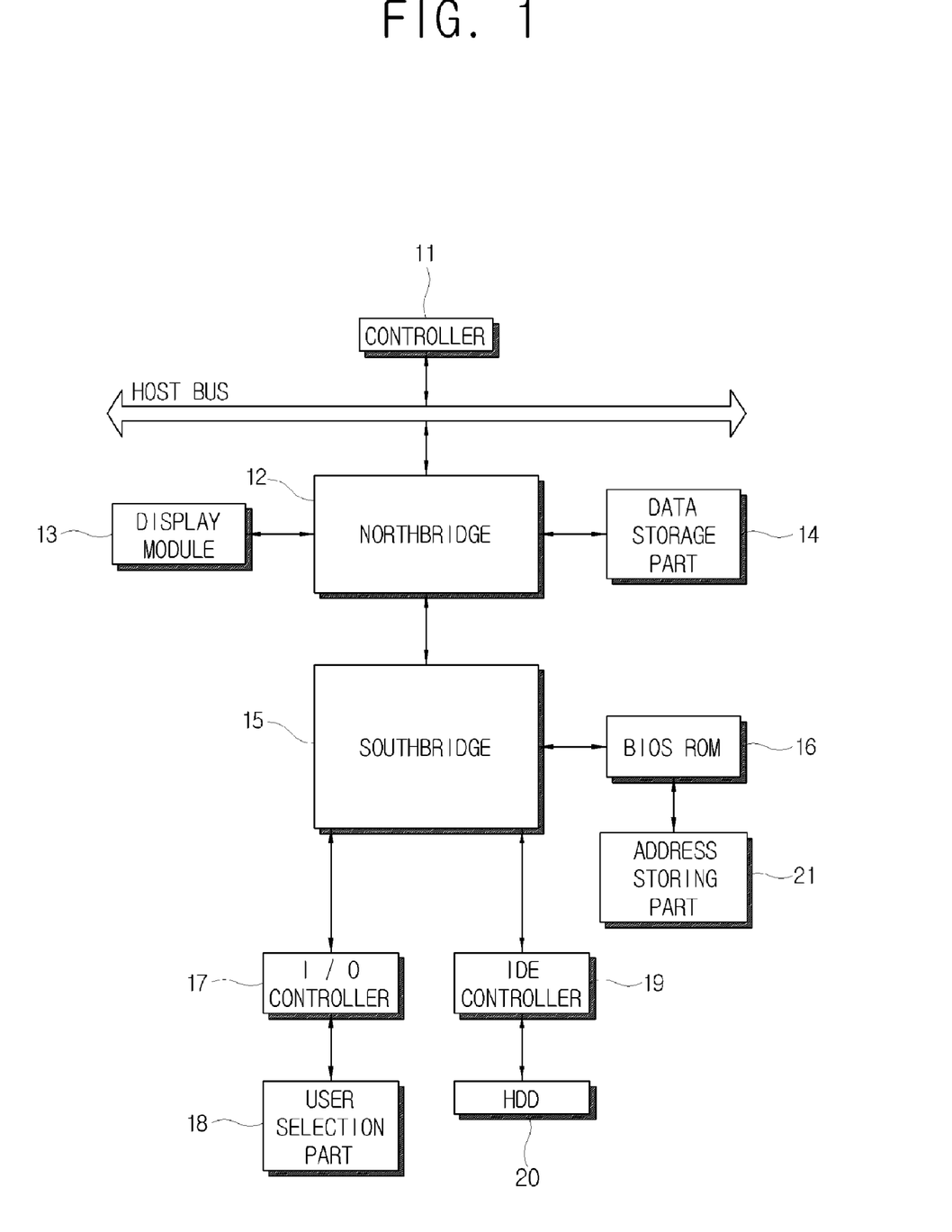
FIG. 1 is a control block diagram of a computer system according to an exemplary embodiment of the present general inventive concept.

FIG. 1 is a control block diagram of a computer system according to an exemplary embodiment of the present general inventive concept. Referring to FIG. 1, the computer system according to the exemplary embodiment of the present general inventive concept comprises a controller 11, a Northbridge 12, a display module 13, a data storage part 14, a Southbridge 15, a BIOS ROM 16, an input/output (I/O) controller 17, a user selection part 18, an integrated drive electronics (IDE) controller 19, a hard disk drive (HDD) 20, and an address storage part 21.

The Northbridge 12 is a chip which is set to control data which moves among the controller 11, the data storage part 14 and the display module 13, and is a graphic memory control hub which includes a function of a video processing unit (not illustrated). If the Northbridge 12 is an Intel system, it may include a function of a memory control hub (MCH).

The data storage part 14 according to an exemplary embodiment of the present general inventive concept is used to read and write data by the controller 11, and is a volatile memory which loses stored data when the computer system is powered off. The data storage part 14 according to an exemplary embodiment of the present general inventive concept may be provided as Random Access Memory (RAM), Dynamic RAM (DRAM), Synchronous DRAM (SDRAM), Double Data Rate SDRAM (DDRSDRAM), and other known memories in the art.

The display module 13 is an image processor which processes external or internal video signals. The display module 13 includes an image processing part (not illustrated) to process the video signals and a display (not illustrated) to display the processed video signals as images.

The Southbridge 15 is a chip set to control data which moves among the I/O controller 17, the IDE controller 19 and the BIOS ROM 16 and includes an input/output control hub.

The user selection part 18 includes a key or other selection mechanism to select operability of a cell inspection function to inspect a defective cell in the data storage part 14, and may be provided as a keyboard, a mouse, and other known devices in the art.

The address storage part 21 stores an address of the defective cell of the data storage part 14, and may be provided as a non-volatile memory. The non-volatile memory includes a complementary metal-oxide semiconductor (CMOS), a hard disk, and other known memories in the art.

The BIOS ROM 16 stores a BIOS. The BIOS has a start-up routine and a service processing routine, and includes a function to process a hardware interrupt.

The start-up routine is a built-in software to control and test a system device and performs a process called power on self test (POST) to assure that the system device operates properly when the computer system powers on.

The controller 11 inspects and determines whether there is a defective cell in the data storage part 14, and sets the defective cell to be assigned to a predetermined device.

In detail, the controller 11 is booted when a signal is generated from a chip (not illustrated) which controls system reset and performs the POST process. If the POST process is completed, the controller 11 loads an operating system (O/S) such as Microsoft Windows into the memory after the POST process. Accordingly, the controller 11 can perform O/S booting of various hardware device drivers being installed by the O/S. When the O/S booting is finished, the computer system operates normally. The controller 11 can read contents of the BIOS and stores them in the data storage part 14, and can also execute the BIOS process.

If the POST process starts, the controller 11 performs a cell inspection function to inspect and determine whether there is a defective cell in the data storage part 14.

The controller 11 can also enable a user to select whether to perform the cell inspection function. That is, when the POST process starts, the controller 11 displays a message to allow the user to select whether to perform the cell inspection function. If the cell inspection function is selected through the user selection part 18, the controller 11 inspects and determines whether there is a defective cell in the data storage part 14.

If it is determined that there is a defective cell in the data storage part 14, the controller 11 sets the defective cell to be assigned to a predetermined device. Thus, the defective cell in the data storage part 14 is not accessible when the data is read or written after the computer system is completely booted.

Figure 2A:
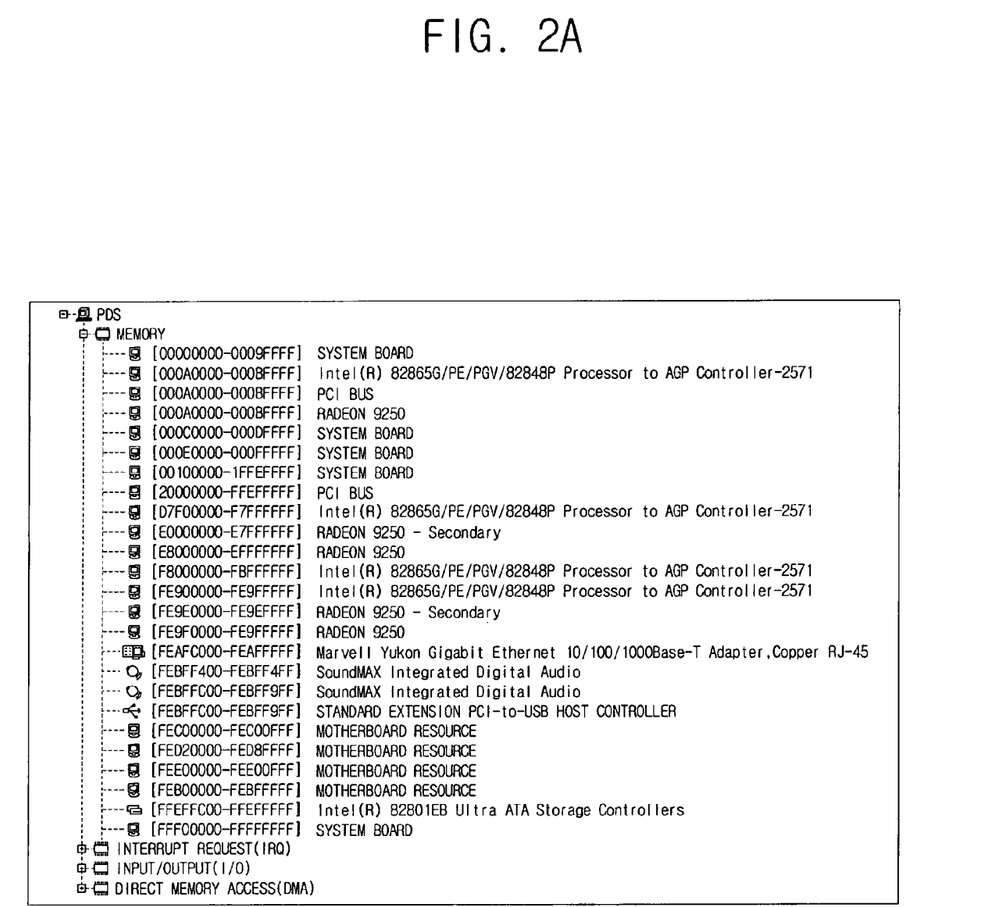
FIG. 2A illustrates devices set to correspond to each address of a data storage part according to an exemplary embodiment of the present general inventive concept.

Referring to FIG. 2A, for example, each address is assigned to a device which uses each region of the data storage part 14, which is set up by the controller 11 by performing the POST process when the computer system is booted.

Figure 2B:
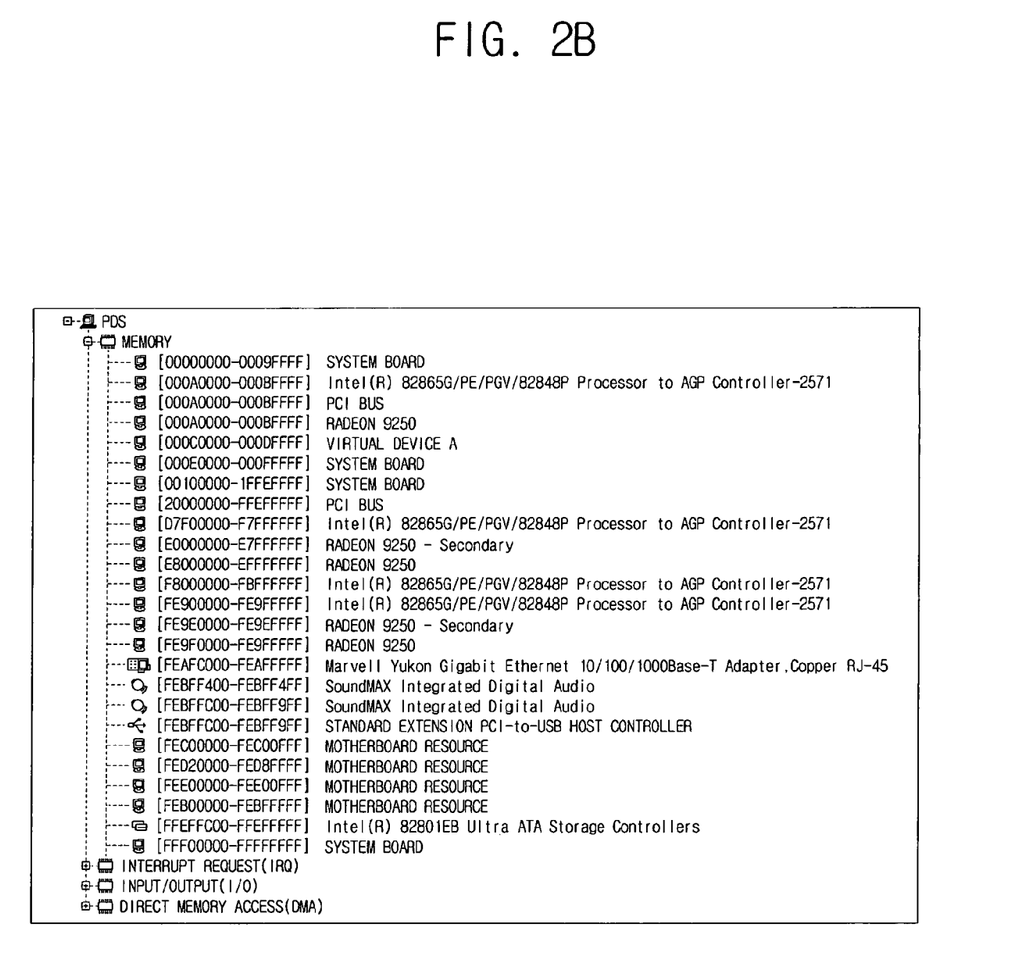
FIG. 2B illustrates devices set to correspond to addresses of a data storage part where a defective pixel exists according to an exemplary embodiment of the present general inventive concept.

If a defective cell is found in the data storage part 14 as a result of the cell inspection function in a subsequent booting of the computer system, and the address of the defective cell is 000C0000, the controller 11 sets the address 000C0000 which is assigned to a system board to be assigned to a virtual device A, as illustrated in FIG. 2B. Accordingly, since the address 000C0000 of the defective cell in the data storage part 14 is assigned to the virtual device A, another device cannot access the address 000C0000 after the computer system is completely booted.

Further, after the cell inspection function is performed, the controller 11 may store the address of the defective cell corresponding to the confirmed defective cell of the data storage part 14 in the address storage part 21. As described above, the address storage part 21 is provided as a non-volatile memory, and thus the address of the defective cell remains in the address storage part 21 although the computer system powers off.

If the cell inspection function is not selected from the user selection part 18, the controller 11 checks whether an address of the defective cell is previously stored in the address storage part 21. Also, the controller 11 sets the address of the defective cell corresponding to the previously stored address of the defective cell of the data storage part 14 to be assigned to a predetermined device, and thus the defective cell is not accessible even if the cell inspection function is not selected.

After the cell inspection function is performed, the controller 11 determines whether the address of the defective cell which was previously stored in the address storage part 21 is identical to the address of the defective cell which was checked through the cell inspection function. Then, the controller 11 updates the address of the defective cell stored in the address storage part 21 to the address of the defective cell which was checked by the cell inspection function.

If a defective cell is not found in the data storage part 14 after the cell inspection function, the controller 11 deletes all the addresses of the defective cells stored in the address storage part 21 so that a normal cell is accessible.

Accordingly, a defective cell in the data storage part 14 is set to be assigned to a predetermined device to be inaccessible, thereby allowing a memory which includes the defective cell to be used. Further, the memory with the defective cell may be available without an additional circuit, thereby reducing costs of the computer system.

Hereinafter, a control method of the display device according to the exemplary embodiment of the present general inventive concept explained above will be described with reference to FIG. 3.

Figure 3:
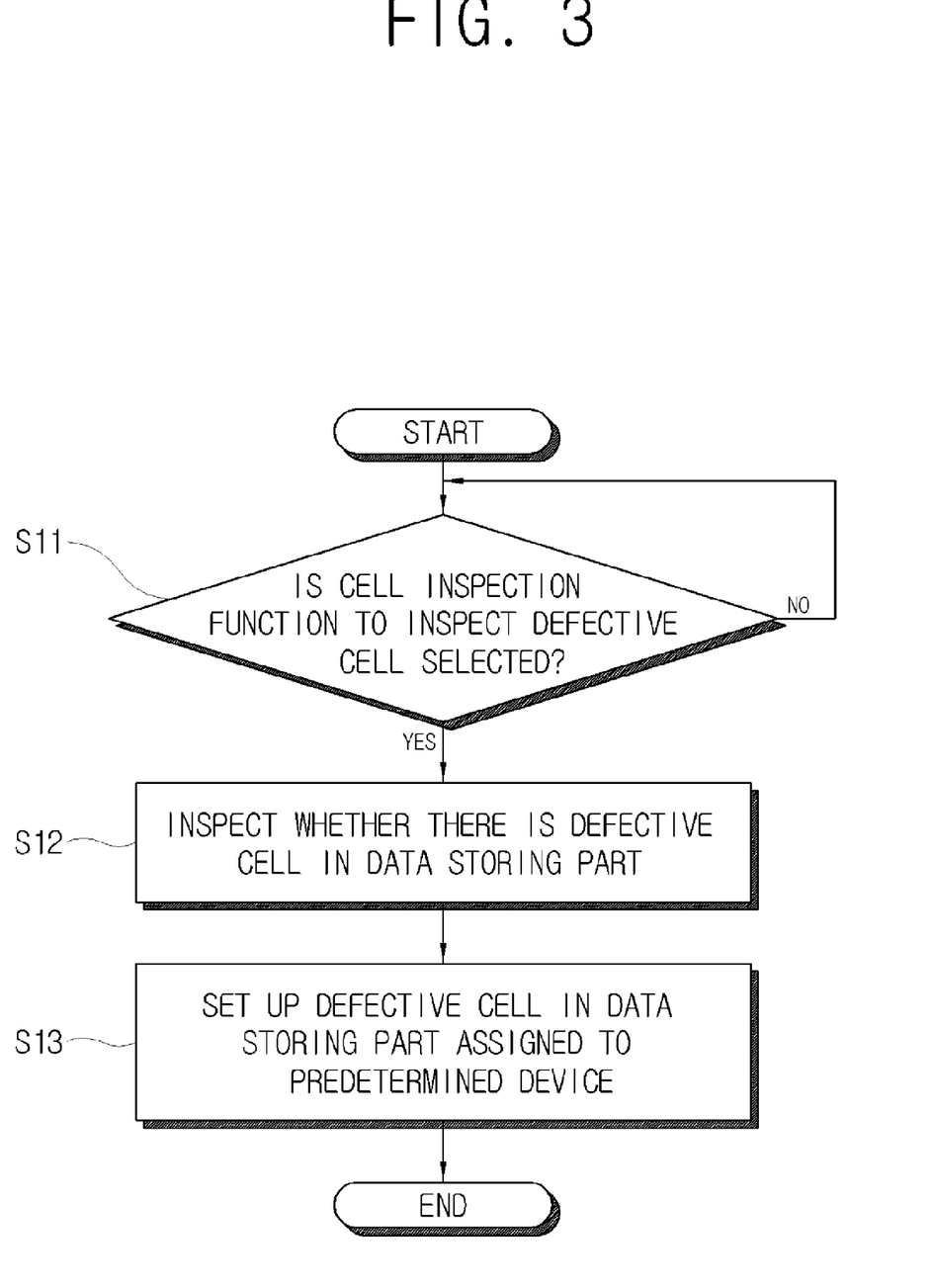
FIG. 3 is a control flow chart to illustrate a control process of the computer system according to an exemplary embodiment of the present general inventive concept.

Referring to FIG. 3, if a performance condition corresponding to the cell inspection function is met in operation S11, the controller 11 inspects and determines whether there is a defective cell in the data storage part 14 in operation S12.

As described above, the cell inspection function may be performed when the POST process is performed or the cell inspection function is selected through the user selection part 18. Alternatively, the cell inspection function may be performed by selection of the user through display of a predetermined message when the POST process starts to perform.

The controller 11 sets the defective cell in the data storage part 14 to be assigned to a predetermined device in operation S13.

After detecting the defective cell in operation S12, the controller 11 may store an address of the defective cell corresponding to the defective cell of the data storage part 14 in the address storage part 21.

Figure 4:
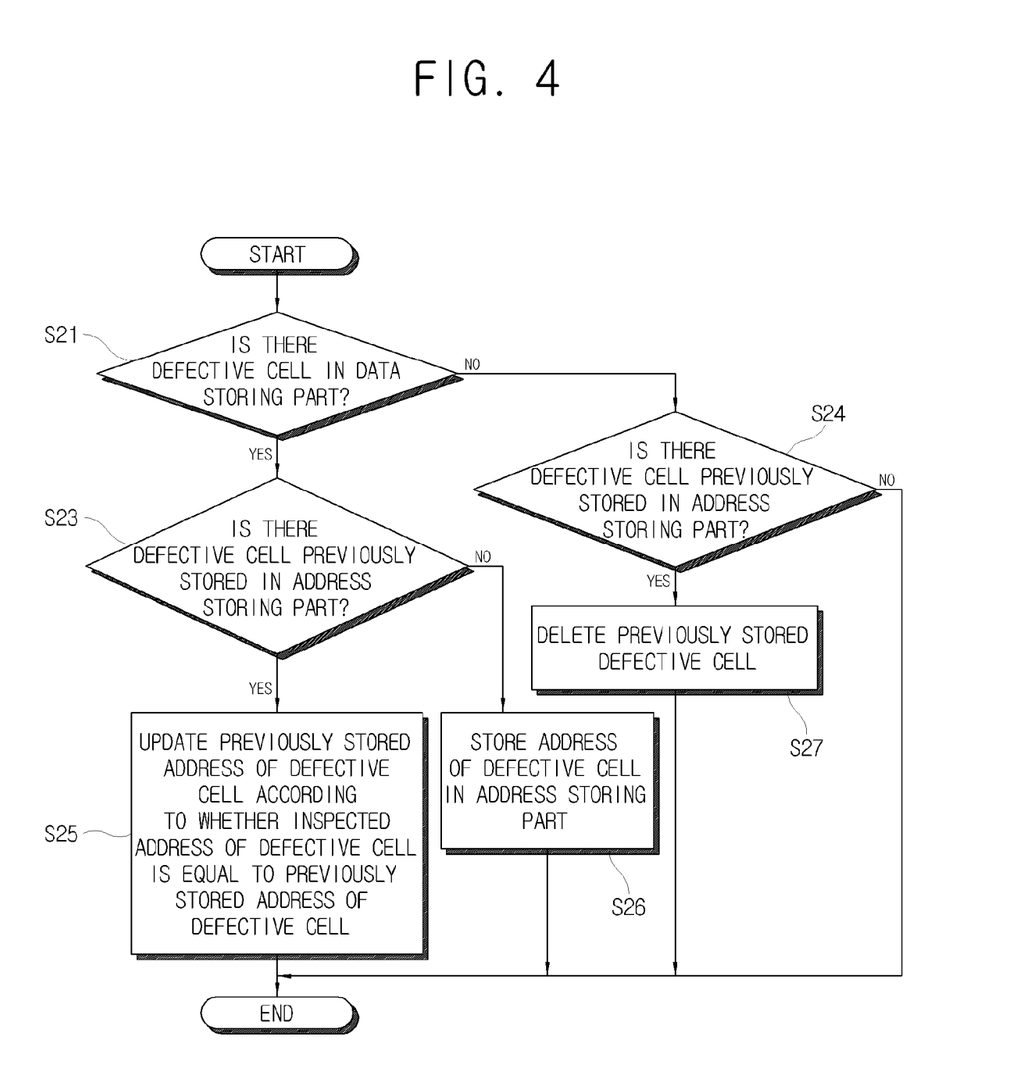
FIG. 4 is a control flow chart to illustrate a process of updating a defective cell address stored in an address storage part of the computer system according to an exemplary embodiment of the present general inventive concept.

Hereinafter, a process of updating an address of the defective cell according to the result of performance of the defective cell inspection when the controller 11 stores the address of the defective cell in the address storage part 21 will be described.

Referring to FIG. 4, if a defective cell is found in the data storage part 14 in operation S21 as a result of conducting the defective cell inspection, the controller 11 confirms whether the address of the defective cell is previously stored in the address storage part 21 in operation S23.

If the address of the defective cell is previously stored in the address storage part 21 in operation S23, the controller 11 updates the address of the defective cell previously stored in the address storage part 21 according to whether the address of the defective cell as a result of the inspection, is equal to the previously stored address of the defective cell in operation S25.

If the previously stored address of the defective cell is not found in the address storage part 21 in operation S23, the address of the defective cell, as a result of the inspection, is stored in the address storage part 21 in operation S26.

If a defective cell is not found in the data storage part 14 as a result of the defective cell inspection in operation S21, the controller 11 checks whether an address of the defective cell is previously stored in the address storage part 21 in operation S24.

If an address of the defective cell is previously stored in the address storage part 21 in operation S24, the controller 11 deletes the previously stored address of the defective cell in operation S27.

Accordingly, a region which includes a defective cell is set to be used in a predetermined device so that the defective cell is not accessible, thereby allowing a memory which includes the defective cell to be used. Further, the memory with the defective cell may be used without an additional circuit, thereby reducing cost and power consumption of the computer system.

Additionally, the controller 11 described above according to an exemplary embodiment of the present general inventive concept may be provided as a BIOS.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the present general inventive concept provides a computer system which does not allow using a memory having a defective cell by way of software so that the memory having the defective cell can be used, and a control method thereof.

Further, the present general inventive concept also provides a computer system which allows use of the memory having the defective cell without an additional circuit to thereby reduce cost and improve a use period.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computer system having a plurality of physical devices, comprising:
    a volatile memory serving as a data storage part comprising a plurality of cells to store data, wherein the plurality of cells of the volatile memory are assigned to the plurality of physical devices by associating addresses of the plurality of cells with the plurality of physical devices, respectively;
    a non-volatile memory to store information associating the addresses of the plurality of cells of the volatile memory with the plurality of physical devices, respectively; and
    a controller to inspect and determine whether there is a defective cell in the data storage part if a condition to execute a cell inspection function is met, and, if a defective cell is found, to set the defective cell to be assigned to a predetermined virtual device different from each of the plurality of physical devices to prevent access to the defective cell from the plurality of physical devices,
    wherein the defective cell is assigned to the predetermined virtual device by updating the information stored in the non-volatile memory such that the address of the defective cell of the volatile memory is associated with the predetermined virtual device.

2. The computer system according to claim 1, wherein the controller performs the cell inspection function when a power on self test (POST) process is performed.

3. The computer system according to claim 1, further comprising:
    a user selection part to select whether to perform the cell inspection function, wherein the controller performs the cell inspection function if the cell inspection function is selected from the user selection part.

4. The computer system according to claim 1, further comprising:
    an address storage part to store an address of a defective cell of the data storage part,
    wherein the controller stores the address of the defective cell corresponding to the defective cell in the address storage part when it is determined that the defective cell is in the data storage part.

5. The computer system according to claim 4, wherein the controller updates the address of the defective cell stored in the address storage part according to whether the address of the defective cell of the data storage part is identical to the address of the defective cell previously stored in the address storage part as a result of the performance of the cell inspection function.

6. The computer system according to claim 5, wherein the controller updates the address of the defective cell stored in the address storage part by changing and/or deleting the address of the defective cell.

7. A control method of a computer system which comprises a plurality of physical devices and a volatile memory serving as a data storage part to store data, the method comprising:
    determining whether there is a defective cell in the data storage part if a condition to execute the cell inspection function is met; and
    if it is determined that there is a defective cell in the data storage part, setting the defective cell to be assigned to a predetermined virtual device that is not one of the plurality of physical devices to prevent access to the defective cell by the plurality of physical devices,
    wherein the defective cell is assigned to the predetermined virtual device by updating information stored in non-volatile memory such that the address of the defective cell of the volatile memory is associated in the non-volatile memory with the predetermined virtual device.

8. The control method of the computer system according to claim 7, wherein the cell inspection function is performed if a POST process is performed.

9. The control method of the computer system according to claim 7, wherein the cell inspection function is performed if the cell inspection function is selected by a user.

10. The control method of the computer system according to claim 7, further comprising:
    storing an address of a defective cell corresponding to the defective cell when it is determined that the defective cell is in the data storage part.

11. The control method of the computer system according to claim 10, further comprising:
    updating the address of the defective cell stored in the address storage part according to whether the address of the defective cell of the data storage part is identical to the address of the defective cell previously stored in the address storage part as a result of performing the cell inspection function.

12. The control method of the computer system according to claim 11, wherein the updating the address of the defective cell stored in the address storage part comprises:
    changing and/or deleting the address of the defective cell.

13. A computer system having a plurality of physical devices, comprising:
    a volatile memory serving as a data storage part comprising a plurality of cells to store data;
    a non-volatile memory to store information associating the addresses of the plurality of cells of the volatile memory with the plurality of physical devices, respectively; and
    a controller to inspect and determine whether there is a defective cell in the data storage part and to make the defective cell inaccessible to the plurality of physical devices by assigning the defective cell to a predetermined virtual device that is not one of the plurality of physical devices so that the data storage part can be used, wherein the defective cell is assigned to the predetermined virtual device by updating the information stored in the non-volatile memory such that the address of the defective cell of the volatile memory is associated with the predetermined virtual device.

14. The computer system of claim 13, wherein the controller performs the cell inspection function when the computer system is powered on.

15. The computer system of claim 13, further comprising:
an address storage part to store an address of a defective cell of the data storage part to prevent another device from accessing the defective cell.

16. A control method of a computer system having a plurality of physical devices and a volatile memory serving as a data storage part comprising a plurality of data-storing cells, the method comprising:

inspecting to determine whether there is a defective cell in the data storage part; and controlling the defective cell to be inaccessible to the plurality of physical devices by assigning the defective cell to a first virtual device that is not a physical device so that the data storage part can be used, wherein the defective cell is assigned to the predetermined virtual device by updating information stored in non-volatile memory such that the address of the defective cell of the volatile memory is associated in the non-volatile memory with the predetermined virtual device.

17. The method of claim 16, further comprising:
updating an address of the defective cell if the defective cell is located again during a second inspection.

* * * * *